(No Model.)
R. S. LOVELACE.
VELOCIPEDE.
No. 564,797. Patented July 28, 1896.
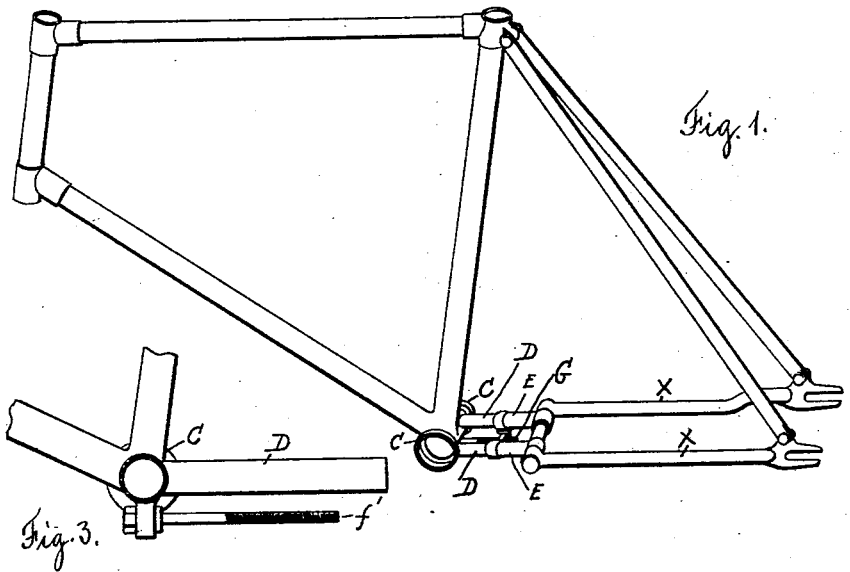
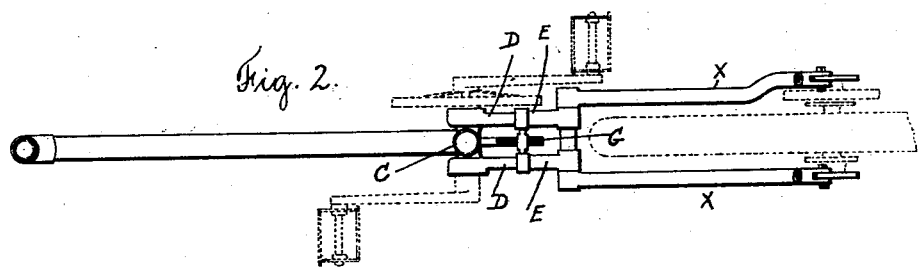
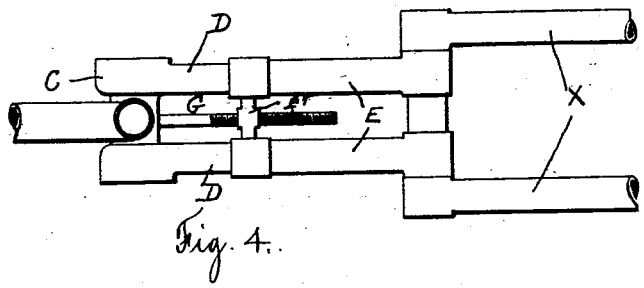
Witnesses.
Inventor.
R. S. Lovelace,
By
Southgate & Southgate
Attorneys

UNITED STATES PATENT OFFICE.

ROBERT S. LOVELACE, OF HENTSRIDGE, ENGLAND.

VELOCIPEDE.

SPECIFICATION forming part of Letters Patent No. 564,797, dated July 28, 1896.

Application filed March 16, 1896. Serial No. 583,292. (No model.) Patented in England October 27, 1891, No. 18,474.

*To all whom it may concern:*

Be it known that I, ROBERT S. LOVELACE, a subject of the Queen of England, residing at Hentsridge, in the county of Somerset, England, have invented a new and useful Improvement in Velocipedes, of which the following is a specification.

The invention shown, described, and claimed in this application covers one of the features shown in British Letters Patent No. 18,474, dated October 27, 1891, granted to me.

The aim of the invention covered by this application is to improve the construction of the ordinary diamond-shaped velocipede or bicycle frame for rear driving cycles.

The pedal crank-axle is mounted in the well-known manner in a bearing-bracket which has two tubular arms formed on or fixed to it. These arms are fitted into extensions or pieces connecting to the lower back fork, and one or both of the braces forming the lower back fork is or are connected to these extensions, so that the inner end or ends of said brace or braces will be offset outwardly or laterally relatively to the point or points of connection to the crank-axle bracket. By this construction I provide a bicycle-frame in which the chain will be in substantially the same vertical plane as one of the braces constituting the rear fork, whereby the strain of the chain will not tend to buckle or twist this brace, as is the case where the brace is inclined outwardly from the pedal crank-axle bracket to the rear end thereof, which carries the rear wheel of the bicycle.

I also show and describe herein a construction in which said arms are telescoped into said connecting-pieces, and an adjusting-screw provided, so that the rear braces may be adjusted relatively to the crank-axle bracket for the purpose of adjusting the tension of the driving-chain, but this feature of construction forms no part of the inventions herein claimed, and may be omitted simply by securing said arms rigidly in said connecting-pieces.

Referring to the accompanying drawings, forming part of this specification, and which illustrates the principle of the construction which I desire to protect by Letters Patent of the United States, Figure 1 is a perspective view of a velocipede or bicycle frame constructed according to my invention. Fig. 2 is a sectional plan view of the same, the position of the pedals and sprocket-wheels being indicated in dotted lines. Fig. 3 is a detail view illustrating the way the adjusting-screw is connected, and Fig. 4 is a partial plan view illustrating the connections between the pedal crank-axle bracket and the braces constituting the rear fork.

Referring to the drawings and in detail, C designates the pedal crank-axle bracket, and D D arms projecting therefrom adapted to slide in pieces E E, connecting to the braces X X, forming the lower back fork of the machine in which the driving-wheel of the bicycle is mounted.

G designates a screw which is journaled in a lug projecting downwardly from the pedal crank-axle bracket, as shown in Fig. 3. This screw is tapped into a bridge-piece $f'$, which is arranged between the ends of the extensions E E. With this construction of frame it will be obvious that the members of the upper back fork must be pivotally attached to the other members of the frame or to the axle of the driving-wheel to allow for the variation in the length of the lower back fork, as is shown in Fig. 1. By adjusting the screw G the length of the lower back fork can be shortened or lengthened to adjust the tension of the chain.

The point of advantage of my construction lies in the fact that the braces X X, which form the lower rear fork, are offset outwardly relatively to the ends of the pedal crank-axle bracket, or the ends of the braces which form the lower back fork toward the pedal crank-axle bracket are separated from each other a distance greater than the width of the crank-axle bracket. This construction will bring the brace on the same side of the machine as the sprocket-wheels, or the side of the machine where the driving-chain is to go, in substantially the plane of the sprocket-chain, whereby the pull of said chain will not tend to buckle said brace, which is the case where said brace is inclined to any degree relatively to the chain from its rear end to its point of connection to the crank-axle bracket. So far as this feature of my invention is concerned, it would only be necessary to offset one of the braces X to accomplish this result and to use one connecting-piece E.

The details of construction herein shown and described may be varied by a skilled mechanic without departing from the scope of my invention, as expressed in the claims.

Having thus fully described my invention, what I claim, and desire to secure by Letters Patent, is—

1. The combination in a bicycle-frame of the pedal crank-axle bracket, braces forming the lower back fork, a connecting-piece between the brace on the side of the machine where the driving-chain is to go and said crank-axle bracket, so arranged that the end of said brace toward the crank-axle bracket is set outwardly beyond the end of the crank-axle bracket, whereby said brace is brought substantially into the plane of the driving-chain, substantially as described.

2. The combination in a bicycle-frame of the pedal crank-axle bracket, arms D, D projecting rearwardly therefrom, the rear braces X, X forming the lower back fork, and a connecting-piece between the arm D and the rear frame-brace X on the side of the machine where the driving-chain is to go, arranged so that the end of the brace will be offset outwardly, substantially as described.

3. The combination in a bicycle-frame of the pedal crank-axle bracket, arms D, D projecting therefrom, rear braces X, X forming the lower back fork, and connecting-pieces E, E between the ends of said braces and said arms D, so arranged that the braces X, X are offset outwardly, substantially as described.

4. The combination in a bicycle-frame of the pedal crank-axle bracket, braces forming the lower back fork, and connections therefrom to the crank-axle bracket, so arranged that the ends of the braces toward the pedal crank-axle bracket are separated from each other a distance greater than the width of the crank-axle bracket, substantially as described.

In testimony whereof I have hereunto set my hand in the presence of two subscribing witnesses.

ROBERT S. LOVELACE.

Witnesses:
REGINALD ALDRIDGE,
HARRIE E. SHANE.